United States Patent [19]

Morganstein et al.

[11] Patent Number: 5,249,219

[45] Date of Patent: * Sep. 28, 1993

[54] INTEGRATION OF VOICE STORE AND FORWARD FACILITY

[75] Inventors: Sanford J. Morganstein, Elgin; Herbert B. Krakau, Elmhurst; Mark D. Klecka, Dekalb, all of Ill.

[73] Assignee: Dytel Inc., Phoenix, Ariz.

[*] Notice: The portion of the term of this patent subsequent to Mar. 24, 2009 has been disclaimed.

[21] Appl. No.: 822,933

[22] Filed: Jan. 21, 1992

Related U.S. Application Data

[63] Continuation of Ser. No. 40,564, Apr. 17, 1987, Pat. No. 5,099,509.

[51] Int. Cl.⁵ .............................................. H04M 1/66
[52] U.S. Cl. ...................................... 379/84; 379/197
[58] Field of Search ....................... 379/67, 69, 70, 84, 379/197

[56] References Cited

U.S. PATENT DOCUMENTS

| | | |
|---|---|---|
| 3,614,328 | 10/1971 | McNaughton et al. |
| 3,867,582 | 2/1975 | Weed et al. |
| 4,371,752 | 2/1983 | Matthews et al. |
| 4,582,957 | 4/1986 | Hayes et al. |
| 4,747,124 | 5/1988 | Ladd .................................. 379/67 |
| 4,763,353 | 8/1988 | Canale et al. ..................... 379/157 |
| 4,766,604 | 8/1988 | Axberg ............................... 379/67 |
| 5,099,509 | 3/1992 | Morganstein et al. ........... 379/69 X |

Primary Examiner—Stuart S. Levy
Assistant Examiner—Joseph A. Rhoa
Attorney, Agent, or Firm—Baker & Botts, L.L.P.

[57] ABSTRACT

Call completion apparatus is disclosed for enhancing the integration of voice store and forward facilities with calling parties attempting to complete telephone calls to a telephone switching system. The call completion equipment intercepts incoming calls, provides voice prompts to the calling parties, and collects telephone extension digit information. On a determination of the unavailability of the called party, the call completion equipment prompts the calling party concerning an optional connection to voice store and forward equipment. In response to the input of a digit code by the calling party, the call completion equipment consults personality tables, translation tables and call flow control tables to provide all the appropriate information which is outpulsed through the telephone switching system to the voice store and forward facility. The operations of the call completion equipment in establishing communications with the voice store and forward facility are transparent to the calling party.

4 Claims, 3 Drawing Sheets

INTEGRATION OF VOICE STORE AND FORWARD FACILITY

RELATED APPLICATIONS

This application is a continuation of application Ser. No. 07/040,564, filed Apr. 17, 1987, and entitled "Intgeration of Voice Store and Forward Facility", now U.S. Pat. No. 5,099,509, issued Mar. 24, 1992, which is related to an application entitled "Busy/No-Answer Call Completion Equipment", by Morganstein et al., Ser. No. 909,755, filed Sep. 22, 1986.

TECHNICAL FIELD OF THE INVENTION

The present invention relates in general to telecommunications equipment, and more particularly relates to methods and apparatus for interfacing voice store and forward facilities into a telephone switching system.

BACKGROUND OF THE INVENTION

The telecommunication field continues to experience an expansion of new functions and features to further enhance voice communications. One feature which has gained wide acceptance is a voice store and forward feature which allows storage and retrieval of voice messages between individuals without the need of the individuals to communicate directly with each other. The voice store and forward feature is generally a centrally located system having a number of "voice mailboxes" which can be reached by persons desiring to leave a message for another person, and where the other person can call in at a later time and retrieve such message. With this arrangement, persons can communicate in an indirect manner, notwithstanding their general unavailability for direct communications.

Voice store and forward facilities are adapted for use with telephone switching systems so that subscribers can communicate indirectly with other subscribers having assigned voice mailboxes. The deposit of a voice message by an outside party calling into a telephone switching system is not always so easily accommodated. Indeed, a person uninitiated with the procedures for invoking the services of voice store and forward facilities often finds it cumbersome to utilize such features. The voice store and forward feature is generally invoked through a telephone switching system when the called party's telephone set is busy, or when there is no answer to the incoming call.

If not integrated, the voice store and forward facility traditionally prompts the calling party to again enter the extension number of the called party and a code representative of whether the voice mailbox is to be accessed for deposit or retrieval of a message. Not only does this represent an additional procedural burden on the calling party, but also, in many cases, the performance of the voice store and forward facility is compromised. By this it is meant that if the calling party hangs up prematurely without completing the deposit of a voice message, or if the calling party inadvertently forgets to dial a predetermined stop code, the voice store and forward system may have to remain on-line an extended period of time to determine if an on-hook condition of the calling party exists. This often occurs as some switching systems generally do not transmit disconnect supervision signals to the voice store and forward facilities. As a result, the voice store and forward apparatus must monitor the telephone line for an additional period of time, such as twenty to thirty seconds, as an indication of an on-hook condition of the calling party.

From the foregoing, it can be seen that a need exists for a method and apparatus employed in connection with telephone switching systems to more fully integrate voice store and forward functions with the switching systems and thereby further facilitate the use thereof by calling parties.

SUMMARY OF THE INVENTION

In accordance with the present invention, methods and apparatus are disclosed which substantially reduce or eliminate the shortcomings and limitations associated with prior art techniques. The call completion equipment of the invention provides a high level of integration between telephone switching systems and voice store and forward facilities. According to a preferred embodiment of the invention, on encountering a busy or no answer condition of the called telephone set, the call completion equipment of the invention consults a personality table to ascertain whether the called extension is provided with voice store and forward options. On an affirmative indication, the calling party is provided with a voice prompt to input a predetermined code, such as "*", if it is desired to deposit a message with the voice store and forward facility. The call completion equipment then consults a translation table to find the call sequence according to which the call should be processed. The translation table includes information defining the destination of the voice store and forward system, as well as the particular voice mailbox to be accessed. In the event the voice mailbox does not correspond to the called extension number, as it may be, a call flow control is required.

The call completion equipment then consults a call flow control table to determine the nature of the modification required to complete the call to the particular voice mailbox of the voice store and forward system. Also, additional call flow control tables may be provided in the event that a single telephone or PBX switching system subscribes to the services of more than one voice store and forward facility.

In accordance with another feature of the invention, the call completion equipment of the invention can pass disconnect supervision signals to the voice store and forward system, which feature was available only if integration was built into the telephone switching system. On-hook conditions of the calling party are thus quickly detected by the voice store and forward facility, whereupon the input ports of such facility can be quickly switched to service other requests. A technical advantage of this feature is that fewer input ports of the voice store and forward facility may be required.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same elements throughout the views, and in which.

DETAILED DESCRIPTION OF THE INVENTION

Figure 1:
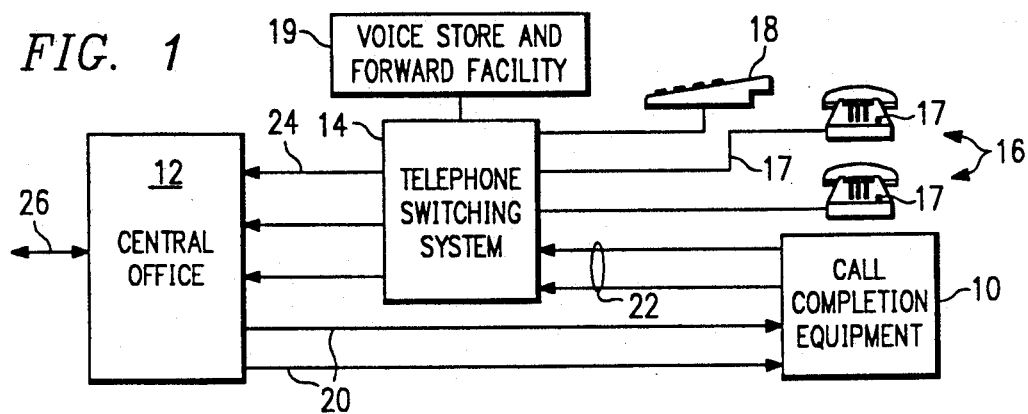
FIG. 1 is a block diagram illustrating an application in which the invention may be advantageously practiced.

The application of the present invention is best understood by referring first to FIG. 1 of the drawings the invention interconnected in a telecommunication network is illustrated. Particularly, the invention 10 is shown as adjunct equipment 10 associated with a telephone switching system, such as a private branch exchange (PBX) telephone system. While the invention is ideally suited for use with an on-premises type of telephone switching system 14, the illustrated application is not to be construed as a limitation to the uses of the invention. Moreover, the invention may be integrated within many types of telephone switching systems, rather than being added on as adjunct equipment.

The telephone system 14 may be of the type which serves a plurality of telephone sets 16, and which is equipped with a switchboard attendant 18. The telephone sets may also be equipped with message waiting lamps 17. The switchboard attendant 18 may be signalled to assist calling parties in completing calls to the telephone sets 16. Voice store and forward equipment 19 may also be utilized in conjunction with the telephone switching system for allowing calling parties to deposit voice messages when called parties are unavailable. The terms "voice store and forward facility" and "voice messaging facility" as used herein are synonymous. As will be detailed more fully below, voice store and forward equipment allows persons to communicate back and forth by depositing and retrieving voice messages. While the voice store and forward equipment 19 is shown connected to the telephone switching system 14, such equipment could be constructed integral with such switching system, or could be remotely located and accessed through long distance communication facilities. Messages deposited with the facility 19 may be brought to the attention of the called party by illuminating the message waiting lamp 17 on the telephone set 16 assigned to the called party.

In one type of arrangement, the call completion equipment 10 is connected to the central office 12 by one or more incoming trunks 20 on which telephone calls are directed to the telephone system 14. Incoming telephone calls on trunks 20 are processed by the call completion equipment 10 and redirected to the on-premises system 14 by communication lines 22. Calls originated within the telephone switching system 14 by one of the telephone sets 16 are processed by the telephone switching system 14 and redirected to the central office 12 on one of the outgoing trunks 24. The central office 12 is generally equipped with an interoffice trunk 26 for providing telephone communications to other central offices, or to tandem long distance switching equipment (not shown).

According to one mode of operation of the invention, all incoming calls from the central office 12 to the telephone switching system 14 are first intercepted by the call completion equipment 10 on incoming trunks 20. In an alternate method of operation, calls can be received by the switching system 14 and sent to the call completion equipment 10 over lines 22 which may be of the station or trunk type. Dialing information received on incoming trunks 20 is processed by the call completion equipment 10 in a manner similar to that described in co-pending U.S. patent application Ser. No. 593,526, filed Mar. 26, 1984, and entitled PBX Intercept and Caller Interactive Attendant Bypass System. According to the noted interactive system, there is transmitted a message over the trunk 20 to the calling party, requesting the input of dialing information associated with a destination telephone set 16, e.g., the called party. On receipt of the digits dialed by the calling party, the interactive system forwards such digits on the communication lines 22 to the telephone switching system 14. The communication lines 22 may be conventional station lines, such as the types which connect the telephone switching system 14 to the telephone sets 16.

The telephone switching system 14, whether it be a PBX, Centrex system, key system or other type of telephone system, is adapted to readily recognize the extension number transmitted over communication lines 22. In a conventional manner, the telephone switching system 14 will transmit a ringing current to the telephone set 16 uniquely identified by the dialed digits. The telephone switching system 14 will also transmit audible ringing signals to the call completion equipment 10 via the communication lines 22. The telephone switching system 14 will continue to ring the selected telephone set 16 until the called party answers. In the event that the selected telephone set 16 is already off-hook, and is thus being currently used by the called party, the telephone switching system 14 will return a busy signal to the call completion equipment 10 by way of the communication lines 22. The audible ringing and the busy signals supplied by the telephone switching system 14 over the communication line 22 constitute call progress tones for alerting the calling party as to the status of the call which is attempted to be completed.

The call completion equipment 10 makes provisions for both of those instances in which the destination telephone set is not answered in response to an incoming call, and in which the destination telephone is off-hook, indicating the called party is busy. In one mode of operation of the present equipment, the calling party is given a choice of options, one of which includes leaving a message for the unavailable called person. This contrasts with prior art devices wherein some telephone switching system did not provide such an option, but automatically forwarded calls to a voice store and forward system via inherent software which allowed integration only with voice store and forward systems which were specifically designed to accommodate such switching system proprietary signalling.

It is not only an object of the present invention to provide the calling party with options, but also it is another object of the present invention to provide integration with a wide range of telephone switching systems and voice store and forward systems not otherwise designed for this integration.

Figure 2:
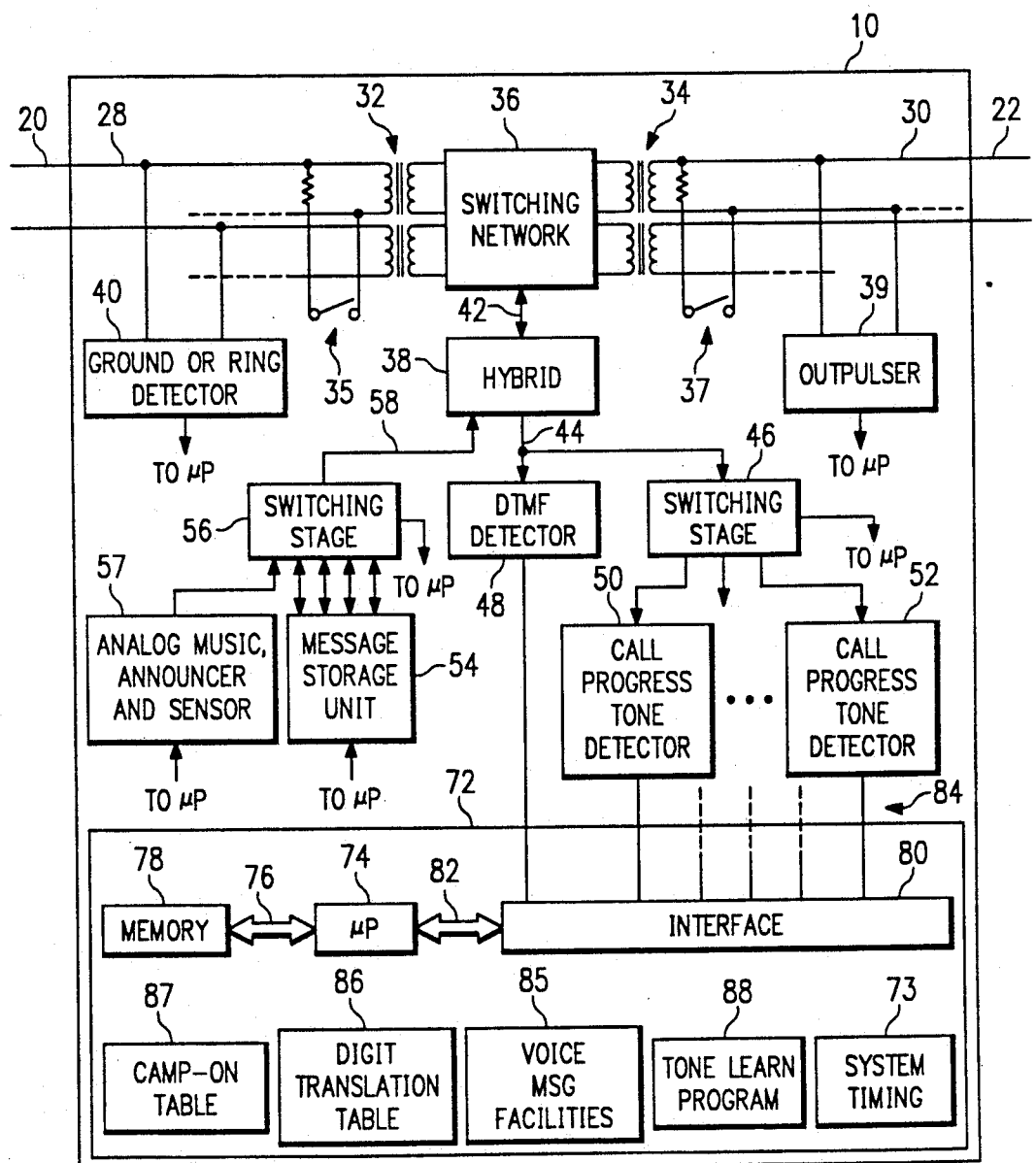
FIG. 2 is a detailed block diagram of the invention.

The call completion equipment 10 shown in FIG. 2 is provided with an input port 28 connected to the incoming trunk 20. An output port 30 is connected to the communication line 22. The input port 28 and the output port 30 are transformer coupled by respective transformers 32 and 34 to a switching network 36. A pair of loop closure relay contacts 35 and 37 are independently operable to provide a closed loop to the respective incoming trunk 20 and the communication line 22. The loop closures signal the switching systems connected thereto of acknowledgements and requests for service. An outpulser 39 is bridged across the communication line 22 and is operable to outpulse a telephone number, either by DTMF signalling or by dial pulses, under control of other circuits of the call completion equipment 10. The switching network 36 is operative to couple the input transformer 32 either to the output transformer 34, or to a hybrid 38. A ground and ring detect circuit 40 is coupled to the input port 28 for detecting ground and ringing indications transmitted by the central office 12 on the incoming trunk 20.

The switching network 36 is connected to the hybrid 38 by a bidirectional conductor 42. The hybrid 38 is connected by a unidirectional outgoing conductor 44 to a first switching stage 46 and to a DTMF detector 48. The detector 48 is of conventional design and can provide an output responsive to the detection of the standardized DTMF signals transmitted by non-rotary type telephone sets. An integrated circuit suitable for use as a DTMF detector is identified as type 8870, and obtainable from Mitel Corporation. Dial pulse receivers can be used in combination with the DTMF detector 48, or in lieu thereof, to respond to digits dialed from a rotary-type telephone set. Speech recognition circuits which are still costly and still being perfected can be used with equal advantage as either the DTMF or rotary dial detection types. The first switching stage 46 is effective to selectively switch signals carried by the unidirectional outgoing conductor 44 to a pair of call progress tone detectors 50 and 52. Circuits suitable for call progress tone detection are identified as integrated circuit type LM 567, and obtainable from National Semiconductor. While each call progress tone detector 50 and 52 is effective to detect call progress tones, the following description will proceed assuming that the first switching stage 46 couples tones from conductor 44 to detector 50.

A message storage unit 54 for storing a plurality of prompt messages is switchably connected by a second switching stage 56 to an input port 58 of the hybrid 38. With this arrangement, prompt messages can be transmitted through the hybrid 38 in one direction, and call progress signals can be simultaneously received by the call progress detector 50 through the hybrid 38 in an opposite direction. The message storage unit is connected to the switching stage by bidirectional buses so that information can also be input into the storage unit 54 via the input ports of the call completion equipment 10. With this capability, a call completion equipment administrator can effect a change, addition or deletion of the data stored within the storage unit. The administrator can, for example, place an incoming call to the call completion equipment 10 and by a code, or other means, place the equipment in a mode for accessing the storage unit 54 and changing the contents thereof. The switching stage 56 includes another input for switching a source 57 of analog music or voice announcements therethrough to the calling party. This may be accomplished, for example, during periods of time when the calling party is placed on hold or camp-on by the call completion equipment 10.

The call completion equipment 10 further includes a processor complex 72 for controlling all the electrical apparatus of the invention according to a software program. Timing and synchronization of all the electrical apparatus is controlled by many clock phases according to the system timing 73. The processor complex 72 includes a microprocessor 74 connected by a bidirectional bus 76 to a memory 78, including RAM and ROM storage areas. The memory 78 also includes various look-up tables described below. The bidirectional bus 76 is shown in simplified form, but in practice may include multiple bidirectional buses for carrying address and data information between the microprocessor 74 and the memory 78. Also included in the processor complex 72 is an interface 80 by which the microprocessor 74 can control the other electrical circuits of the call completion equipment 10.

A communication bus 82 couples signals between the microprocessor 74 and the interface 80. The interface 80 provides a plurality of outputs 84, each of which is connected to electrical circuits controlled by the microprocessor 74. For example, the microprocessor 74 receives information from the ground and ring detector 40 through the interface 80 indicating when ground and ringing conditions are present on the incoming trunk 20. The processor complex 72 can then execute appropriate instructions of its program to respond to the noted signals on the incoming trunk 20. The interface 80 is also connected to the various switching networks and stages 36, 46 and 56 so that various electrical paths can be established to route information to desired equipment in the call completion equipment 10. In a similar manner, the message storage unit 54 is processor controlled through the interface 80 to transmit appropriate messages through the second switching stage 56 to the calling party. The other circuits of the call completion equipment are controlled by the processor complex 72 in the manner described below with the software flow charts.

Stored in the memory 78 of the processor complex 72 are various tables referred to by the microprocessor 74 during the processing of an incoming call on trunks 20. A voice store and forward messaging table section 85 includes those telephone extension numbers which are provided with voice messaging features. A digit translation table 86 may be consulted to automatically translate one extension number into another, such as is done with a call forwarding feature. A camp-on table 87 may be interrogated to ascertain whether an automatic camp-on function should be invoked in connection with predetermined telephone extension numbers. A tone learn program 88 may be employed to obtain and store the signature of call progress tones transmitted by the tone generator of the telephone switching system 14.

Figure 3A:
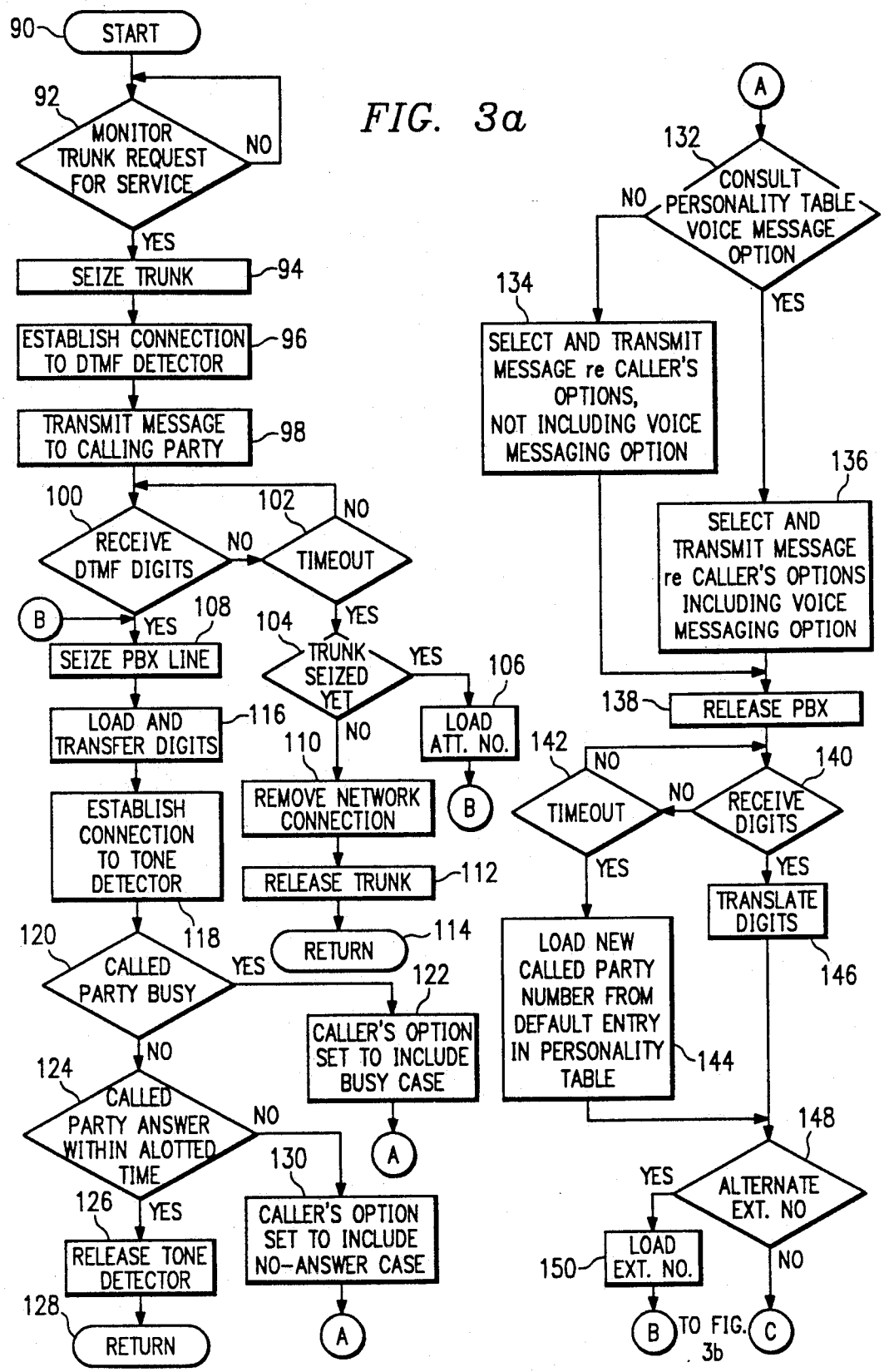
FIGS. 3a and 3b illustrate in flow chart form a program flow executed by the call completion processor to provide the functions of the invention.
Figure 3B:
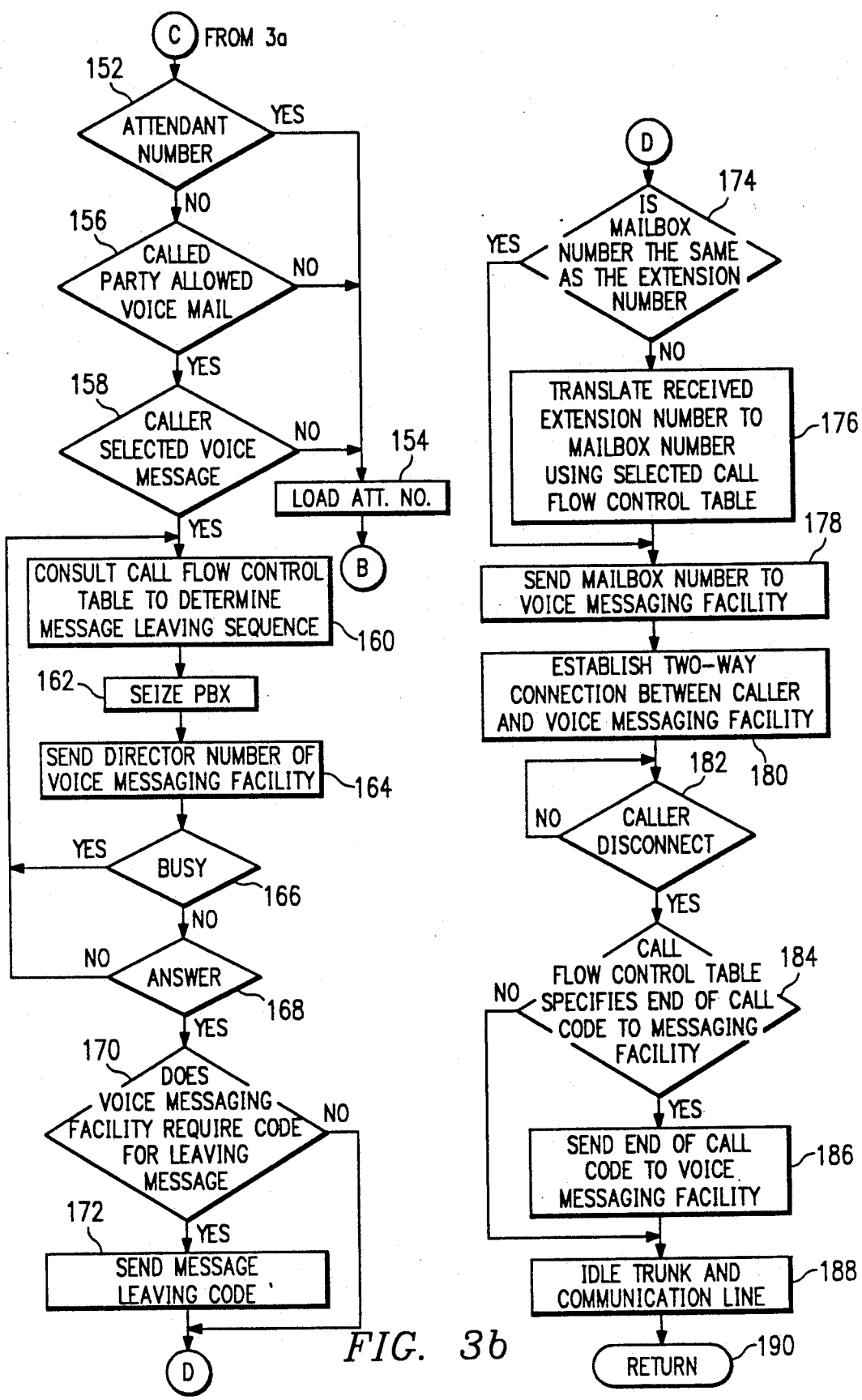

The call completion equipment 10 processes an incoming call from a central office 12 and redirects the telephone call to the telephone switching system 14 using the circuits as shown in FIG. 2, as controlled by the processor complex 72 in the manner shown by the flow charts of FIGS. 3a and 3b. More specifically, the flow charts illustrate a situation in which a call directed to the telephone switching system 14 causes a selected telephone set 16 to be rung, but such set is not answered by the called party. The processing of busy and no-answer calls is addressed in co-pending application entitled "Busy/No-Answer Call Completion Equipment", Ser. No. 909,755, filed Sep. 22, 1986. As noted above, the busy/no-answer situation occurs frequently, with the result that the calling party generally has no alternative but to hang up and attempt to complete the call at a later time. Other sophisticated systems, such as identified above as "PBX Intercept and Caller Interactive Attendant Bypass System", provide an automatic nondiscretionary connection of the calling party to an attendant after it is apparent the called party is not going to answer.

Block 90 of the FIG. 3a flow chart indicates an initial program location to which the microprocessor 74 is directed for responding to requests for services received from the central office 12 over the incoming trunk 20. It should be understood that the incoming trunk 20 is merely exemplary of requests from parties originating a telephone call, as such request may originate from other types of lines, equipment or switching systems. Decision block 92 illustrates a decisional program loop in which the microprocessor 74 routinely monitors the ground and ring detector 40 by repetitively interrogating an associated appearance on the interface 80. Depending upon the type of incoming trunk 20 employed, a request for service may be in the form of a conventional ringing signal from the central office 12, or a ground applied to the tip conductor of the trunk 20. When such a request for service is detected by the detector 40 and presented to the microprocessor 74 by way of the interface 80, the incoming ringing is tripped by closing the trunk loop 20. The microprocessor 74 causes switch contacts 35 to be closed, thereby seizing the trunk 20 and allowing loop current to flow therethrough. As a result, the central office 12 detects the trunk loop closure and terminates the ringing signal.

Next, and according to flow diagram block 96, the processor complex 72 causes a connection to be established in the switching network 36 for connecting the incoming trunk 20 to the hybrid 38. The processor complex 72 also monitors the output of the DTMF detector 48 for DTMF dialing signals, and the output of the call progress tone detector 50 for progress tones. Block 98 represents the processor complex functions which select an appropriate message from the message storage unit 54, establish a connection in the switching stage 56 and transmit the selected message through the hybrid 38 and network connection 36 to the calling party over the incoming trunk 20.

The specific operations and apparatus for accomplishing this is set forth in more detail in the noted co-pending applications, the entire subject matter of which is incorporated herein by reference. Pursuant to the transmitted message, the calling party can dial the telephone extension number of the called party with whom communications are desired, without the need of the services of the telephone switching system switchboard attendant 18. It should be noted that in the case that the incoming trunk lines 20 are of the direct inward dial (DID) type, the receipt of address and destination information begins automatically after trunk seizure and handshaking according to methods well known in the art. In this case, a transmitted message instructing the calling party to send a telephone extension is not necessary. Block 100 of the flow chart indicates the decisional block as to whether the digits of the extension number have been received. Such digits are also stored for later use in identifying a particular voice mailbox associated with the called party. Voice store and forward facilities 19 generally provide a number of voice mailboxes, each identified by a digit sequence, such as a telephone extension number. In other types of voice store and forward facilities, the voice mailboxes numbers may not correspond to the extensions of the called parties.

A timeout 102 of a predetermined period of time is established in the program to form a window in which the dialed digits can be received. If the calling party dials no information within this predetermined period of time, and if the incoming trunk is yet seized 104, control of the microprocessor 74 is branched to block 106 where the identification of a default answering position is loaded into a processor register. In the example, the default answering position is the switchboard attendant 18.

In accordance with the flow diagram, the program is branched from block 106 to 108 to establish a talking path between the default answering position 18 and the calling party. In other words, in the event that the calling party does not dial any digits in this time period, and does not go on hook, automatic assistance is provided by the connection to the switchboard attendant 18 or some other predesignated default. In some situations, such as after office hours, the processor 72 can automatically load the directory number of the voice messaging facility 19 in a register, whereupon, in encountering block 106 the call completion system 10 would be prepared to outpulse digit information for connecting the calling party directly to the voice messaging facility 19. With reference back to block 104, there is shown a situation in which the calling party may go on-hook during or after the transmission of the initial instructional message 98. In the event the calling party goes on-hook, i.e., abandons the call, the network connection is removed 10, the trunk is released 112 and control of the microprocessor 74 is returned 114 to the start 90 of the program.

With reference again to block 100 of the FIG. 3a flow chart, program control of the microprocessor 74 is transferred to block 108. The PBX communication line 22 is seized by closing the contacts 37 bridged across the line 22. This is a conventional signal to the telephone switching system 14 of a request for service on the communication line 22.

The digits received from the calling party by the DTMF detector 48 are loaded 116 into a temporary register for subsequent transfer to the telephone switching system 14. The output of the DTMF detector 48 is thus switched to the incoming trunk 20 and made available to the processor complex 72 to determine which pair of tones are received, and for determining the corresponding digit. The call progress tone detector 50 is monitored by the microprocessor 74 to decode the specific type of call progress tone received. With this switched arrangement, the call progress tone detector 50 processes the signals output by the hybrid 38 to determine the nature and type of signal received.

The functional features of the call progress tone detector 50 is described in the co-pending application entitled "Busy/No-Answer Call Completion Equipment". Other conventional call progress tone detectors can be utilized. Nevertheless, it is sufficient to understand here that the call progress tone detector 50 can distinguish between many signals including a busy status or a ringing status of the called telephone set 16. When the call progress tone detector 50 is connected as described, it can monitor progress signals generated by the telephone switching system 14 as transmitted to the call completion equipment 10 on the communication line 22.

According to block 116, the default answering position's telephone number previously loaded into the register is outpulsed by pulser 39 over the communication line 22. To be described in more detail below, the invention also makes provisions for accessing the voice messaging facility 19 utilizing the outpulser 39 under control of the processor 72. The telephone switching system 14 establishes a connection pursuant to the attendant's telephone number between the communication line 22 and the attendant 18.

According to block 120, if a busy signal is detected by the call progress tone detector 50, control is branched to flow block 122 where the caller's option is set to include a busy case. This information is utilized later in completing the call. From block 122 the program directs the processor 72 to entry point A which will be described below. In the event that a busy signal is not detected, then control is branched to block 124 where the communication line 22 to the called party is monitored to determine if the called party has answered in the allotted period of time. If an affirmative indication is detected, the tone detector is released 126 and the program flow is returned 128 to the start. When the called party answers within the allotted period of time, the telephone switching system 14 is connected to the trunk 20 and the called party is thus connected to the calling party.

When it is assumed that the called party associated with the telephone set 16 is not going to answer, and that further ringing is futile, the caller's option is set to include a no-answer case. This is illustrated in program flow block 130.

One skilled in the art would recognize that the processing described herein is time-shared among a plurality of calls and that the descriptions of control branching is to be taken figuratively, rather than literally. When the line of the called party continues to ring, the microprocessor 74 determines whether the telephone set 16 has been rung a predetermined length of time. The length of time the called telephone set 16 is rung before further action is taken is arbitrary, and thus can be adjusted or specified according to a personality table described in more detail below. Beyond this length of time, it can be assumed that the called telephone set 16 will not be answered.

The program entry point A illustrates a case when the calling party cannot reach the desired called party, and default assistance is automatically invoked. A message can be transmitted to the calling party including information concerning the situation in which the called telephone set 16 cannot presently be reached, but that the telephone call may be completed to a secondary destination by alternative means. For example, the calling party may be assisted by completing a call to another party associated with the telephone switching system 14, or by the assistance of the switchboard attendant 18, or by verbally depositing a message using the voice store and forward messaging facility 19.

Communication exchanges may be equipped with voice messaging apparatus which provides an indirect exchange of communications, without the concurrent exchange of messages. In other words, one party may call a predetermined telephone number and leave a recorded voice message for another party. The other party may later call the number and retrieve the message, and also leave a response. This type of communication technique is described in U.S. Pat. No. 4,371,752. However, not all parties subscribe to or have available to them the optional communication through voice store and forward messaging facilities. Thus, the call completion equipment 10 of the invention must determine, as is shown in program block 132, whether the called party has a voice messaging option. This is determined by consulting a personality table which resides in the memory of the processor 72. If this determination is in the negative, a special message is selected 134 from the message storage unit 54 and transmitted to the calling party. This message will instruct the party as to the redialing of an alternate telephone extension number, or as to some default assistance. If, on the other hand, the voice messaging option is available to the called party, a different message is selected 136 in the message storage unit 54 for transmittal to the calling party. This message includes the same informational content as that noted in block 134, and in addition advises the calling party that the voice messaging option is available.

The communication line 22 to the telephone switching system 14 is released 138 and the call completion equipment 10 awaits for the transmission of digits from the calling party. If digits are not received 140 within a timeout period 142, and if the trunk 20 is yet seized by a calling party, the processor 72 loads 144 the telephone or directory number of a new called party into the processor register. The new called party's number is preassigned and can be automatically changed depending on a number of considerations For example, at night, the new called party's number might be the directory number of the voice messaging facility During the day it might be the switchboard attendant 18, or it might be the voice messaging facility if a certain party's line is called, whereas if other lines are called it would be the switchboard attendant. It is important to understand that a general voice mailbox of the messaging facility 19 may be designated to which default calls are directed. With this arrangement, an operator or person can routinely retrieve voice messages deposited therein and then subsequently redistribute the messages to the appropriate called parties.

The receipt 140 of digits by the DTMF detector 48 is accompanied by the translation 146 of such digits to determine whether an alternate number or the default answering position number has been dialed, or whether the voice messaging option has been indicated. The receipt of a four digit number generally signifies a particular extension number associated with a particular telephone set 16. If a valid alternate extension number has been dialed 148 by the calling party, it is loaded 150 into a register for subsequent outpulsing. If the digits received from the calling party cannot be identified as a valid alternate extension number, the digits are next checked 152 to determine if a default answering position number, in the nature of a switchboard attendant 18, has been received. The instructional message transmitted according to block 136 will generally specify what digits should be dialed in order to be connected to the telephone switching system default answering position call completion assistant.

Generally, it is only necessary to dial the digit "0" to obtain the assistance of a switchboard attendant, or some other similar default answering position. The instructional message transmitted to the calling party will indicate the digit or digits to be dialed for connection to the default answering position 18. While a representation of the digit "0" may be loaded 154 directly into the register, an intermediate translation may be conducted in accordance with the translation table 86. For example, if call completion assistance is being handled by a telephone set other than the switchboard 18, then the telephone number of the other set can be loaded into the register 104 instead of the switchboard designation "0". This aspect is advantageous when a switchboard attendant 18 is not available, such as during lunch or at night, calls can still be completed to an alternate destination, such as a guard station or the like.

If neither an alternate extension number 148 nor a default answering position number 152 have been received and decoded by the DTMF detector 48, the digits received are next checked to ascertain if the called party is allowed 156 voice mail, e.g., has a voice mailbox, or if the calling party has selected 158 the voice message option. On a negative determination of either of these conditions, the switchboard attendant's number is loaded 154 and outpulsed.

The instructional message transmitted pursuant to flow chart block 136 will inform the calling party as to the manner in which access can be had to the voice messaging facility. While arbitrary, the instructional message can specify that the dialing of the "*" symbol will be decoded as an instruction to connect the calling party to the voice messaging facility 19. If the dialed digit or digits received from the calling party signify the voice message option 158, an appropriate directory number is loaded into a register for subsequent outpulsing to the telephone switching system 14. A translation of the voice message designation symbol is made, and the translated number is loaded into the register. The translated number will be a directory number which uniquely identifies the destination at which the voice messaging capability can be accessed. For example, if the voice messaging facility 19 is co-located with the telephone switching system 14, then such facility can generally be accessed simply by dialing an extension-like number. The telephone switching system 14 will process this number and permit access to the voice messaging facility 19.

If, on the other hand, the voice messaging facility 19 can only be reached by a long distance communication, then such an appropriate number is loaded into the register. As an additional example, a twelve digit number may be loaded into the register to reach an outgoing trunk 24 so that a long distance call can be established. The twelve digit number may include the digit "9" to obtain an outside line, a "1" to signify a long distance call, an area code and a seven digit telephone number. Of course, many other digit translations may be effected to connect the calling party directly to a remote voice messaging facility.

Situations may arise in which the digits received from the calling party comprise neither an alternate extension number, a switchboard attendant number nor a voice messaging designation. An erroneous telephone number may have been inadvertently dialed by the calling party. In this event, a message is selected in the message storage unit 54 and transmitted to the calling party. This message may include informational content indicating that the telephone call cannot be completed as dialed, but that the calling party should redial the number. Control is then appropriately branched to again process the dialed digits, if any, received from the calling party.

In brief summary, it can be seen from the foregoing that with the provision of the call completion equipment 10, many alternatives are available to the calling party for completing a secondary telephone call, even though the primary called party cannot be reached. This is highly advantageous in view that the ability to communicate is important to businesses. It is also important to appreciate that the call completion equipment 10 can be connected to a telephone switching system 14 with little, if any, modification to such switching system. As a result, the combining of the features of the call completion equipment 10, together with the those of the telephone switching system 14 provides additional communication capabilities not heretofore realized.

The call completion equipment 10 can also assist in completing a telephone call when the telephone set 16 of the called party is off-hook, and the called party is therefore busy. The program flow chart of FIG. 3b is reached from an affirmative determination of decisional block 158 (FIG. 3a). According to program flow block 160, the processor 72 consults a call flow control table to define a message leaving sequence. As will be described in more detail below, such a sequence may include the directory number of the voice messaging facility, a code indicating a message retrieval or deposit, other codes indicating pauses or wait for disconnects, etc.

As noted in block 162, and pursuant to the call sequence, the PBX or telephone switching system 14 is seized. The directory number of the voice messaging facility is then outpulsed 164 to the telephone switching system 14. In a conventional manner, the telephone switching system 14 receives the directory number on communication line 22, whereupon a path is established between such communication line 22 and the outgoing PBX line connected to the voice messaging facility 19. A test is conducted 166 to determine if the voice messaging facility 19 is busy. If so, the program flow is branched back to the beginning of block 160. In the event the voice messaging facility 19 is not busy, another determination is made as to whether the voice messaging facility 19 has answered 168 the call. Busy and answer signals are detected in the manner described above. If the voice messaging facility 19 does not respond to the request for service, program control is branched back to flow block 160.

When the voice messaging facility 19 responds to the request for service, an inquiry is made into the internal tables of the call completion equipment 10 as to whether the voice messaging facility 19 requires a code for depositing 170 a message. If such a code is required, the call completion equipment 10 responds by transmitting information to the voice messaging facility corresponding to the code for depositing a message. Other codes may be required if it is desired to retrieve a message from the voice messaging facility. Of course, if no such code is required, the processor 72 is directed from block 170 to block 174. The decision block 174 encompasses those steps taken by the processor 72 in determining whether the voice mailbox number is the same as the extension number initially dialed by the calling party. If such numbers are the same, program control is branched to block 178. On the other hand, if the voice mailbox number is different from the called party's extension number, a translation is made 176 from the extension number to the voice mailbox number, using the selected call flow control table.

Next, the voice mailbox number is transmitted 178 to the voice messaging facility via the telephone switching system 14. A two-way connection is established 180 between the calling party and the voice messaging facility 19. In a conventional manner, the call completion equipment waits for a disconnect 182, signifying the termination of the voice message deposit. The nature in which disconnect information is detected and transmitted by the call completion equipment 10 will be described in more detail below.

On the detection of a disconnect by the calling party, the processor 72 consults 184 the call flow control table to determine if an end of call code is required by the voice messaging facility 19. If no such code is required, the incoming trunk 20 is idled 188, as well as the communication line 22 connected to the call completion equipment 10. If, on the other hand, such an end of call code is required, the call completion equipment 10 loads such code into the register, and outpulses the same to the voice messaging facility 19 to signal such facility that the voice message deposit has been terminated. After the call completion equipment 10 idles the incoming trunk 20 and the communication line 22, return is made 190 to the beginning of the call processing flow chart.

With the foregoing system operation, calling parties are provided with alternative secondary destinations when the primary destination is busy or does not answer. The call completion equipment 10 provides a capability for enabling the calling party to selectively choose various secondary destinations for completing the call.

Having set forth the general operations of the call completion apparatus of the invention, the detailed operation thereof with respect to the integration of the voice store and forward features and PBX systems is set forth below. Detailed Tables I-VI in the Appendix correspond to table 85 (FIG. 2) used with the voice messaging facility 19. Tables I-III depict the general type of information found in the look-up tables, while Tables IV-VI illustrate examples of look-up table 85 entries for a typical installation. Each customer utilizing the call completion equipment of the invention would have tables configured peculiar to the desired needs. Particularly, Table I is a "personality table" having various parameters which govern the processing of each call associated with an incoming trunk 20 directed to the call completion equipment 10. Each incoming trunk 20 is associated with a personality table which defines the characteristics of calls made on such trunks.

Table II illustrates a translation table which is utilized in invoking the services of the voice store and forward facility 19, and in particular defines a set of parameters which are used to request service of the voice store and forward facility 19, define whether a message is to be retrieved or deposited, and define the particular voice mailbox in which it is desired to deposit or retrieve a voice message. More particularly, the digit translation table includes entries concerning digits which are to be matched with dialing information input by the calling party, a number of selectable call sequences which define the particular sequence for accessing and utilizing the voice store and forward facility 19, as well as an index for directing the processor 72 of the call completion equipment 10 to a number of other tables identified as call flow control tables. Table III illustrates the entries of a call flow control table which are utilized in modifying destination determining information input by the calling party before such modified information is output to the voice store and forward facility 19, or more generally, before such information is used to control the flow of steps of processing a call.

After intercepting requests for service by the call completion equipment 10, the processor 72 identifies the particular incoming trunk 20 carrying the request for service. As noted above, each incoming trunk 20 is associated with a particular "personality". The personality table includes an entry which directs the processor 72 to a predefined translation table which, based upon the digits received from the caller, or lack thereof, defines a call sequence to be executed for completing the particular telephone call. The personality table also includes an additional entry which specifies whether an outside party can make additional calls to the telephone switching system 14 without going on-hook, but after the inside party has gone on-hook.

According to other personality table entries, recall personalities are defined, as well as immediate, delay, transfer or direct modes. The nature and extent of a delay is also specified in which an operator or switchboard attendant 18 may respond to an incoming call before an automatic response by the call completion equipment 10. The personality table also specifies the type of message prompt to be transmitted with new, incoming telephone calls; the time which can elapse between calling party dialing in response to a message before a default occurs; and default telephone numbers to which the calling party is automatically directed for assistance. An additional entry to the personality table may include entries defining whether camp-on options are allowed with respect to the particular incoming trunk 20 and the number of times a busy extension telephone 16 may be retried before transmitting a message to the calling party. Lastly, the exemplary personality table defines an entry which specifies whether music is to be transmitted to the calling party when in a hold or camp-on condition. The foregoing personality table entries are only exemplary of the many characteristics which may be ascribed to a telephone call. It is well within the ambit of those skilled in the art to provide additional entries to further define characteristics to be associated with particular incoming lines.

The translation table Table II comprises a first section which includes a number of entries corresponding to destination determining information dialed by calling parties. Generally, the entries in Section 1 of Table II will include all of the telephone extension numbers serviced by the telephone switching system 14 and any other single or multiple digit series utilized by the telephone switching system 14 or the voice store and forward facility 19 in servicing calling parties, whether inside parties or outside parties. When the processor 72 of the call completion equipment 10 consults Section 1 of the translation table for a match between an entry therein and a dialed number, and if no such match is found, the call completion equipment 10 will send the call to the default destination specified in the personality table. It can be seen that Table II includes in Section 1 thereof, blocks of entries corresponding to extension numbers, and various single digit entries, such as "6" and "7" denoting codes associated with the voice store and forward facility 19 for indicating respectively whether it is desired to retrieve a message and leave a message.

On determining a match between a dialed number and an entry in Section 1 of Table II, the processor 72 of the call completion equipment 10 proceeds to Section 2 of Table II, wherein a call sequence is selected. Each entry in Section 1 is associated with a call sequence such that when a match is found by the processor 72, one of the call sequences is automatically selected. As can be seen from the call sequences of Table II, Section 2, the various sequences define the various operations by which the processor 72 can direct a call toward completion. Routine incoming telephone calls handled by the call completion equipment 10 are carried out using call sequence no. 1 namely, Send Dialed Digits received from the calling party directly to the telephone switching system 14, with or without modification thereof. Call sequence 15 is directed to a call flow treatment in which a different personality table is consulted, as well as a retranslation of digits received to provide a new set of destination determining information transmitted to the telephone switching system 14. Call sequence 16 will be described in more detail below in connection with converting an extension number dialed by a calling party into a voice mailbox number associated with the called party having the same extension number.

Table III is illustrative of a call flow control table indexed by an entry in Section 3 of the translation table, Table II. The call flow control table includes a number of entries utilized by the call completion equipment 10 to control the flow of the call to the telephone switching system 14 as well as to change the string of digits received from the calling party before transmitting a resulting modified string of digits to the telephone switching system 14. It should be understood that when the directory number of the voice store and forward facility 19 is input to the telephone switching system, such facility is connected to the call completion equipment 10. Thus, any digit thereafter input to the switching system is transferred directly to the voice messaging facility 19.

Each of the noted call flow control entries comprises a code having a control code and possible mode change codes. For example, the call flow control entry "9F1800C02232727" is interpreted as follows, proceeding from the left to the right of the code. The first digit indicates the digit 9 is to be sent by the call completion equipment 10 to the telephone switching system 14. The alphabetic character "F" indicates a pause allowing the telephone switching system time to seize an outgoing trunk, while the next digit string "1800" is the next series of digits to be sent. The mode change code "CO" directs the processor 72 to change from a tone transmission mode to a rotary pulse transmission mode. The digits "2232727" are thus sent by rotary pulse techniques to the telephone switching system 14.

A control code "C1XX" directs the processor 72 to retranslate dialed digits for sending to the telephone switching system 14. This call flow control table entry is of the type utilized to supply the voice store and forward facility 19 with a voice mailbox number derived from the received extension number. According to this 4-digit control code, the digits are collected and caused to be retranslated according to a translation table defined by two digits occupying the "XX" digit positions. As can be appreciated, the invention may include many translation tables, and may be utilized in connection with a specific call for inserting the table number in the "XX" position of the noted control code. The result thereof is inserted in the outpulsed digit string in place of the control sequence. Translation table 00 placed in the "XX" position refers to a current personality translation table associated with the call.

It is important to understand that the translation of digits received from the calling party can be carried out in connection with different translation tables than were used when the digits were first received by the call completion equipment 10. This feature facilitates the flexibility of the call completion equipment 10 for those instances in which the voice mailbox number is not identical to the called party's extension number, or for cases in which the call completion equipment 10 is required to select one of several different voice store and forward facilities. Also, as an error check, nonexistent translation tables and unmatched dialed digits are effective to remove the control sequence from the outpulsed digit stream, and insert blanks or spaces in lieu thereof. Also, the control sequence "C1XX" places digits anywhere in the outpulsed bit stream based on the dialed number. Several distinct patterns based on a dialed number may reside in a single entry in the call flow control table. For example, the directory number of the voice store and forward facility 19, the voice mailbox number and a message waiting lamp directory number may be specified for each telephone extension of the telephone switching system 14.

The control sequences noted in the translation table may also be nested. In other words, the digits inserted after a retranslation may contain control sequences, including the "C1XX" sequence, which causes yet an additional retranslation of the sequence. After inserting the result of the retranslation and storing the same in a buffer, scanning of the digits to be outpulsed continues in order to locate the various control sequences. Importantly, the search for retranslation control sequences proceeds from right to left, namely, from the last digit entered in the buffer which stores the sequence. Any digit deletion specified by a retranslation occurs from the succeeding digits, which may themselves have been a product of a retranslation, thus mimicking a calling party dialing the succeeding digits. More sophisticated applications of the present invention may utilize this feature.

The "C2" control sequence allows the call completion equipment 10 to wait for an answer from the telephone switching system 14. This control sequence is utilized to ensure that the voice store and forward facility 19 answers before the call completion equipment 10 transmits subsequent digits, such as the voice mailbox number. In this event, if the call completion equipment 10 is connected to the telephone switching system 14 via a direct inward dial (DID) circuit, the call completion equipment 10 will immediately recognize an answer from the voice store and forward facility 19. On the other hand, if the call completion equipment 10 is connected to the telephone switching system 14 by station lines or circuits, then the call completion equipment 10 will recognize and answer after one of the following three events occurs. (1) A ringback tone is absent for at most two complete ringback cycles or is interrupted during a ringing cycle, (2) the call completion equipment 10 detects a dual tone multifrequency (DTMF) digit, or (3) the call completion equipment 10 detects a tone from the voice store and forward facility 19, such tone having a predetermined length. Preferably, the frequency of the tone should be 350, 440, 480 or 620 hertz, and should not be one of the tones provided by the telephone switching system 14 for busy or ringback purposes.

The C2 control code accommodates the situation in which the voice store and forward facility 19 does not answer during a ringback tone cycle. This has the obvious effect of significantly slowing the process of depositing a voice message with such facility. To avoid this shortcoming, and in those cases in which the call completion equipment 10 is connected to the telephone switching system 14 by a station line interface, either a DTMF digit or a tone, as noted above, should be recorded on the individual voice prompts of the voice store and forward audio response equipment. Thus, as soon as the voice store and forward facility 19 responds to a request, the DTMF digit or tone is transmitted through the telephone switching system 14 to the call completion equipment 10. Most voice store and forward machines provide the capability for recording such a tone or signal. In this manner, and according to the invention, the prerecording of a tone or signal in connection with a voice store and forward response functions to speed up the process of automatically reaching the voice store and forward facility 19, if such equipment does not answer during a ring, or in the event the call completion equipment 10 is not connected to the telephone switching system 14 via DID trunks.

In addition, the C2 control wait for telephone switching system answer temporarily suspends outpulsing of destination determining information while the call completion equipment is waiting for an answer from the voice store and forward facility 19. When the call completion equipment 10 is connected to the telephone switching system 14 by a DID trunk, reverse battery indications or other call progress tones are detected, and the call completion equipment 10 proceeds in outpulsing destination determining information to the voice store and forward facility 19.

In accordance with another feature of the invention, the call completion equipment 10 interrupts the communication path between the calling party and the telephone switching system 14 while outpulsing is suspended due to the C2 wait for answer control code. Without this interruption in the communication path, the calling party would hear audible ringback tone, and perhaps an undesirable initial audio prompt from the voice store and forward facility 19, followed by silence during the resumed outpulsing by the call completion equipment 10. This can be appreciated as the call completion equipment 10 provides the appropriate voice mailbox number to the voice store and forward facility 19, and thus the superfluous prompt "Please enter your mailbox number" by the voice store and forward facility 19 is prevented from reaching the calling party. This is an important aspect of the present invention since it presents the calling party with a continuous and logical flow of a call handled by both a telephone switching system and a voice messaging system. This logical flow is one of the elements of the integration. In the event the voice store and forward equipment 19 has already answered before the C2 Wait for Answer control sequence is encountered, outpulsing by the call completion equipment 10 proceeds after such control sequence, without waiting.

In brief summary, the C2 control code is utilized to ensure that the voice store and forward facility 19 responds to a request for service before the call completion 10 transmits the required voice mailbox digits. As an alternative to utilizing the C2 control code, the call completion equipment 10 may be programed with pauses in order to provide for sufficient time for the voice store and forward facility 19 to answer.

Yet another control sequence is a "C3" code which functions to wait for a disconnect from the calling party or a disconnect from the telephone switching system 14. The utilization of this control code by the call completion equipment 10 permits conventional voice store and forward facility 19 to operate more efficiently. Most, if not all, voice store and forward facilities provide an initial voice prompt requesting the calling party to dial or input a code when the message deposit is complete. Since most voice store and forward facilities are usually connected to on-premises telephone switching systems 14, and not directly to the central offices 12, there is no direct signal which informs the voice store and forward facility that the voice message deposit is completed. This frequently occurs if the calling party goes on-hook, and forgets to enter an "end of call" code. In such event, most voice store and forward facilities detect a silence period for about 20 to 30 seconds before the input port of the voice store and forward facility 19 is released. As a result, the input ports of the voice store and forward facility 19 are unnecessarily tied up and not able to service other parties who may want to deposit or retrieve voice messages. In addition, needless memory storage area may be wasted in the voice store and forward facility for storing the additional 20-30 seconds of silence if silence compression is not a feature of the voice store and forward facility.

The call completion equipment 10 is ideally employed in connection with a central office 12 and incoming trunks 20. Such trunks 20 may be adapted to provide ground start or loop start signalling to indicate an on-hook condition of the calling party. In such an event, the call completion equipment 10 can detect such signalling and transmit a message and/or other call complete code to the voice store and forward facility 19 to provide a speedy indication of a completed call. The holding time of the voice store and forward facility 19 is thereby minimized, and such input ports can be freed to service other requests for the storage or retrieval of voice messages. With voice store and forward facilities 19 servicing high volumes of external incoming traffic, the provision of the transmission of speedy disconnect signal thereto can increase the efficiency of such system to the extent that fewer input ports may be required.

While the two-digit C3 control sequence is embedded in a series of other digits or control sequences, the processing of such a control sequence is effective to temporarily suspend outpulsing of digit information located to the right thereof in the sequence. The outpulsing of the remaining portion of the digit sequence is suspended until a disconnect of the calling party or the telephone switching system 14 is detected. After detecting a disconnect, the call completion equipment 10 outpulses the remaining digits of the sequence. In the event there is detected a line disconnect on the telephone switching system side of the call completion equipment 10, the subsequent outpulsing by the call completion equipment 10 is obviously not performed by such call completion equipment 10.

The C3 control code can also be used in conjunction with a C4 control code, to be discussed in more detail below, to allow the call completion equipment 10 to wait until the voice message deposit is completed, whereupon the call completion equipment 10 can transmit a code to the telephone switching system 14 to illuminate a telephone set lamp 17 indicating a message waiting condition. Preferably, the C3 control code (Wait For Answer) sequence should generally appear prior to a Wait For Disconnect to assure that the latter is processed and not ignored due to the absence of an answer from the telephone switching system 14.

The call flow control table (Table III) may also include control sequences for effecting a disconnect between the call completion equipment 10 and the telephone switching system 14. Such a disconnect is designated as control code C4. This disconnect code is utilized in the control sequence to allow the call completion equipment 10 to disconnect the communication line 22 extended to the telephone switching system 14, and recognize a new call from the calling party to the telephone switching system 14. This feature facilitates communications by allowing the calling party to complete multiple calls to the telephone switching system 14 without going on on-hook each time. The two-digit C4 control sequence functions to temporarily suspend outpulsing of the call completion equipment 10 while the telephone switching system 14 connection is interrupted. After a sufficient disconnect time, the call completion equipment 10 initiates outpulsing to the telephone switching system 14. Since the initiation of any outpulsing by the call completion equipment 10 implicitly seizes the telephone switching system 14, there is no need to execute any reoriginate control sequence. In addition, the C4 control sequence permits the call completion equipment 10 to automatically illuminate a message waiting lamp on the telephone set 16 of the called party. This is accomplished by placing a subsequent call to the telephone switching system 14 to which the appropriate digit sequence to illuminate such a lamp is sent.

Various other control sequences may be utilized to facilitate communications between the call completion equipment 10 and the telephone switching system 14. A C5 control sequence specifies the insertion of an incoming trunk number into an outpulsed digit stream. This control sequence allows the call completion equipment 10 to distinguish each call in progress.

A C6 flash control code is effective to generate a hook flash on the subscriber line 22 connecting the call completion equipment 10 and the telephone switching system 14. The hook flash is a short on-hook condition of the subscriber line 22, followed by an off-hook condition. The hook flash duration conforms to standard telephony practices.

The foregoing call sequences and control sequences, together with the personality and translation tables, provide an enhanced integration between voice store and forward facilities 19 and telephone communication switching systems 14. Described below are a number of examples which illustrate the features and advantages of the invention. The enhancements provided by the present invention will be apparent when compared to the prior art techniques, in which communications through the telephone switching system 14 with a voice store and forward facility 19 were accomplished in the following manner to be described below. Avoiding the cumbersome steps described below was only possible if a telephone switching system had special voice store and forward integration capabilities and also only if the voice store and forward facility 19 was specifically designed to operate with the telephone switching system manufacturer's specific protocol. Such protocol option involves data transmission over RS-232 links and special programs within the voice store and forward facilities and the telephone switching system facility to handle such data.

First, on detecting a busy, no answer or otherwise unavailable condition of a called party, the call completion equipment 10 would route the call to the voice store and forward facility for depositing a voice message therewith. Next, the calling party would then be cut through to the voice store and forward facility 19, whereupon an audio voice prompt would be supplied to the calling party to input another code to signify whether it is desired to deposit or retrieve a voice message. Yet an additional prompt would be provided by the voice store and forward facility 19 to request the calling party to input the voice mailbox number, e.g. the called party's telephone extension number. The voice messaging facility prompt would also inform the calling party to append the voice message with the input of a digit to signal the end of the message. Provisions may be made in the voice store and forward facility 19 for prerecording a short phrase by the called party to provide a voice identification to the calling party. Lastly, and at the end of the deposited voice message, the calling party must input a code to signify the end of the voice message. As noted above, many times this end of message code is not input by the calling party, as the normal telephone procedure is simply to hang up once the communication is completed.

The functional operation of the invention to be described below illustrates the simplicity with which calling parties can deposit messages in the voice store and forward facility 19. According to the invention, the calling party simply inputs an initial code, for example "*", to indicate the desire to deposit a voice message in the voice store and forward facility 19 and this simplicity is available with virtually all telephone switching systems and voice storage facilities that use inband signalling for the control of the messaging process. The calling party is then presented with the called party's voice identification, if any, and thereafter simply speaks to deposit the voice message. All other signalling matters with the voice store and forward facility 19 are automatically handled by the call completion equipment 10. Moreover, all signalling is handled using conventional techniques and practices.

The following illustrates in a more detailed manner the steps for carrying out the principles and concepts of the invention. Particularly the steps illustrate call processing of the invention once the calling party has been provided with a voice prompt by the call completion equipment 10 concerning the option of leaving a voice message with the voice store and forward facility 19.

First, the processor 72 of the call completion equipment 10 executes a loop, waiting for a digit transmission from the calling party. A time-out occurs if no digits are received, whereupon default is made to the preprogrammed default which could be a voice mailbox within the voice storage facility. On the receipt of digits input by the calling party, such digits are decoded and stored in digital form in the processor 72. Assuming the calling party responds to the voice prompt to input a symbol "*" to deposit a voice message in the voice store and forward facility 19, the digital representation of the "*" is stored.

A translation table is then consulted, which translation table was tagged as a result of the entries in the personality table referred to above. Section 1 of the associated translation table is scanned to determine whether or not a match exists between the "*" symbol and a table entry. Associated with the symbol "*" is a call sequence and an index to a call flow control table, as noted in Table II. As noted above, if no match is found between the digits, the processor 72 is directed to a default subroutine which connects the calling party to the preprogrammed default. On a digit match, the processor 72 proceeds in obtaining the call sequence associated with the digit match. In the example, the call sequence found corresponds to call sequence 15 which is effective to outpulse the telephone extension digits input by the calling party as an output sequence identifying the voice mailbox of the called party. The index located in Table II, Section 3, associated with the matched digits also specifies an index to a call flow control table. Call processing continues, wherein the call sequence and the index to the selected call flow control table (Table III) are specified in Table II. In the example, the entry in the call flow control table might be as shown below. The call flow control sequence is decoded as follows:

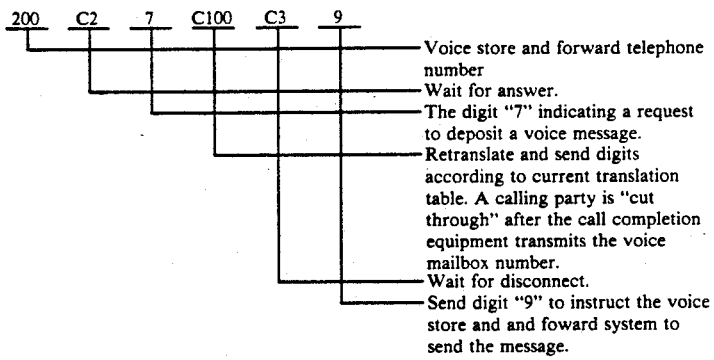

In carrying out a recall sequence and the code sequence according to the call flow control table, the voice store and forward directory number "200" is initially outpulsed to the voice messaging facility 19. After waiting for an answer the "7" digit is outpulsed, after the digits "200". It will be recalled that the digits "200" were initially dialed by the calling party in an attempt to communicate with the called party. Also, the outpulsing of the dialed extension number occurs as a extension. After waiting for a disconnect, the call termination code "9" is outpulsed. As can be appreciated, the processing steps are carried out so that the call flow control sequence and outpulsing of digits are arranged for securing the services of the voice messaging facility 19 with minimal input from the calling party. The arranged digits are then outpulsed to the voice messaging facility 19 in the sequence and in the timed manner to provide signalling exchanges for establishing a communication path to the message facility and place it in a state for depositing a message in the correct voice mailbox. From the foregoing example, a calling party can deposit any voice message with the voice store and forward facility 19 if the called party is busy or does not answer.

Other provisions are made for allowing outside calling parties to deposit a voice message with the voice store and forward facility 19 without regard to whether the called party is busy or available. In this case, a typical voice prompt would be provided by the call completion equipment 10 to the calling party. As a result, the calling party would input the digits, for example, 7300; the "7" indicating a desire to deposit a voice message, and the digits "300" indicating the voice mailbox number of the desired party. On the successful match of digits in the translation table (TABLE II), a call sequence 16 is produced together with a call flow control entry defined by:

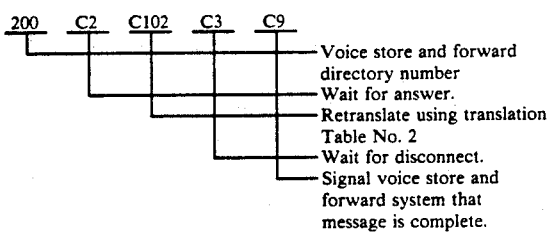

This sequence is similar to the foregoing call flow control entry, except here there is no need to add the digit "7" to the extension number as such digit was initially entered by the calling party. In this type of call, a second translation table is required. If, for example, the "C102" entry were "C100" or "C101", the sequence "7300" would retranslate, match the entry for "7300", and would yield the same entry shown above. This would be repeated until the processor 74 of the call completion equipment 10 stops the repetition after a predetermined number of times. To avoid this, a second translation table is used. Thus, when "7300" matches the entry in translation Table 2, the result yields a call to the voice store and forward facility directly followed by the call completion equipment sending the digits necessary for leaving a message for extension "300".

As an additional example in which the invention facilitates communications with voice store and forward facilities, it is assumed that an outside calling party desires to retrieve a voice message from voice mailbox "300", without ringing the called party. In this event, the calling party is greeted with a voice prompt, whereupon the calling party inputs the digit string "6300". The call completion equipment 10 then consults a translation table for a match with "6300". The match yields a call sequence 16 and a call flow control entry defined by the following:

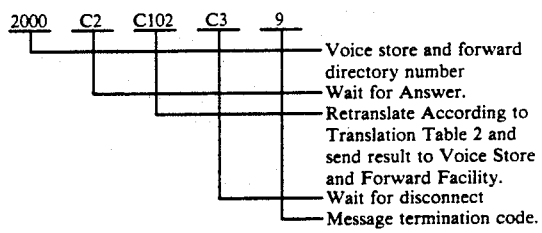

In this example, the digit "6" dialed by the calling party signifies a desire to retrieve a voice message from the voice store and forward facility 19. On retrieving voice messages, the facility 19 generally requires a security code from the caller to verify that the message can be retrieved only by the proper persons. As an alternative to the use of a second translation table, a special code can be required of the calling party to leave or retrieve a voice message without calling the called party. In response to the code, the call completion equipment 10 would then dial the digits "2000" to access the voice store and forward facility 19. The call completion 10 would allow the calling party to complete the dialing directly with the voice store and forward facility.

In those situations where only certain telephone sets 16 of the telephone switching system 14 have associated voice mailboxes in the voice store and forward facility 19, a separate personality and translation table is provided. The different personality and translation tables supply different busy/no-answer messages depending on whether the extensions are associated with voice mailboxes. For purposes of example, assume that an incoming trunk 20 is associated with a first personality, which personality is associated with a first translation table.

All telephone extensions 16 which do not have voice mailboxes are translated to respective call sequences within the noted first table. The first personality then specifies the appropriate messages, which messages do not refer to voice mailbox options. The voice mailbox invocation number would normally not appear in this table, or it might translate to a default. Telephone extensions 16 which are associated with voice mailboxes are matched in this translation table with a call sequence 15. Further processing changes personality tables and retranslates, with the change being made to a second personality table. For purposes of example, the second personality table would utilize the second translation table. All telephone extensions 16 which are associated with voice mailboxes translate to call sequence 1 which sends digits to the telephone switching system 14. This call sequence is located within the second table. The second personality table is structured to specify messages which refer to the voice mailbox option. The voice mailbox invocation number appears in the second translation table, with call sequence 15, and a call flow control may be similar to that shown below:

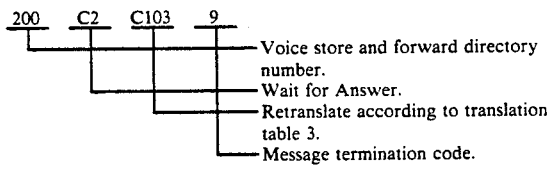

Telephone extensions 16 which are not associated with voice mailboxes are matched in the second translation table with call sequence 15. Such telephone extensions are thus characterized by a new personality table and a new retranslation, with a change being made back to the personality table. While it might seem inappropriate to provide telephone extension numbers which do not have voice mailbox numbers listed in the second translation table, such a structure is needed if, during the message which gives the calling party an option to leave a voice message, the calling party instead calls a second extension number which does not have an associated voice mailbox. The personality table is changed in order to provide, among other things, a busy message which allows the calling party to deposit a voice message. If, during the busy message, the calling party dials an extension number of a party without associated voice mailbox options, then a match in the translation table is required to proceed back to the original personality table which does not invite the calling party to leave a voice message in response to a busy condition of a new called party.

It is important to also note that when the "*" is dialed by the calling party to leave a voice message, call sequence 15 is utilized to change to a third personality table and retranslate according to a third translation table. In the third translation table, there is one entry for which the "*" digit is matched and yields call sequence 16 which forces a call to the voice messaging facility, and a second entry which utilizes call sequence 15 to return calling parties to the first personality. Alternatively, the translation table associated with the third personality may force calling parties dialing digits, other than "*" to a default number Essentially, this process forces all calls back to the first personality table in which the busy/no-answer message does not refer to a voice message option.

The reason for going back to the first personality table in order to use the "busy" message is that when the voice store and forward facility 19 is called, and all of its input ports are busy, it would be inappropriate to prompt the calling party to leave a voice message. Of course, in those situations where the voice store and forward facility is equipped with sufficient ports so that calling parties are never rejected, the use of the third translation table may not be required.

Where outside parties make multiple calls without going on-hook, and in which the inside callers disconnect, the second personality table could either transmit the same primary message as that of the first personality table or the system could change the personality on recall to that which existed with regard to the first personality table. In brief summary, the first personality table and the first translation table handle busy/no-answer sequences for telephone extensions without voice mailbox options. The second personality table and associated second translation table handle busy/no-answer sequences for telephone extensions equipped with voice mailbox options. Moreover, the third translation table is utilized to ensure that an appropriate message is given to the calling parties when all the ports of the voice store and forward system are busy.

Provisions are made in accordance with the invention for accommodating situations in which the telephone extension numbers of the telephone sets 16 do not identically match the voice mailbox numbers of the voice store and forward facility 19. When the voice mailbox numbers are not the same as the extension numbers, a control sequence is provided which specifies a retranslation in connection with a second translation table. With this arrangement, the telephone extension number dialed by the calling party is translated into the appropriate voice mailbox number. For exemplary purposes, assume an incoming trunk 20 has associated with it a first personality table which utilizes a first translation table, and a second translation table which produces the voice mailbox numbers. A call sequence 15 call flow control "add digits" field would appear as follows:

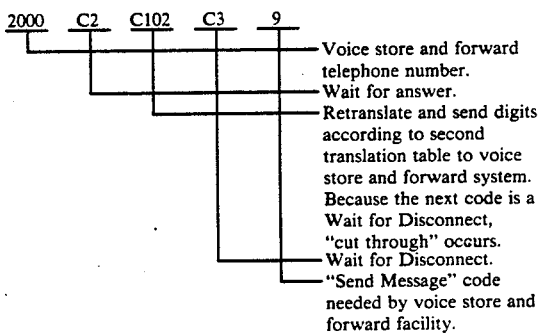

In this example, the voice store and forward facility 19 has a directory number of 2000. After waiting for an answer, the voice mailbox number is outpulsed by the call completion equipment 10 via a retranslation of the dialed digits according to the second translation table.

After waiting for a disconnect, the termination code is outpulsed. If the extension number 9000 was originally dialed by the calling party, and the voice mailbox number is 5000, the second translation table would match 9000, yielding an entry having a call flow control which deletes four digits and inserts the digits 5000. The particular call sequence entry would be immaterial, as call sequence 15 is invoked when the "*" is dialed to deposit voice mail. In any event, the call completion equipment 10 outpulses the following sequence:
    2000 (Wait for Answer)
    5000 (Wait for Disconnect)
    9 (end of message)

The invention also makes provisions for providing voice mailbox services to various telephone extensions 16, groups of which may be serviced by different voice store and forward facilities. An example of this situation may be where multiple telephone switching systems are networked together, and where each such switching system is associated with a different voice store and forward facility. According to the invention, a control sequence is specified which retranslates on a second translation table to derive the particular directory number of the selected voice store and forward facility. In this manner, the dialed number directly selects a desired voice store and forward facility. Assume again that an incoming trunk 20 originates in a first personality table and a first translation table, and a second translation table which produces the desired numbers of the voice store and forward facilities.

A sample call sequence 15 having a call flow control "add digits" field would appear as C12C2C100C39. In this case, the directory number of the voice store and forward facility is selected by a retranslation on a second translation table. After waiting for an answer, the dialed digits are outpulsed via the retranslation on the same translation table used when calling the extension. After waiting for a disconnect, the termination code is outpulsed by the call completion equipment 10. If a calling party dialed the number 9000 to deposit a voice message with a voice store and forward facility identified by directory number 3000, a retranslation on a second table would match 9000, yielding an entry with a call flow control which would delete four digits and insert the digits 3000. The call completion equipment would outpulse the following digit string:
    3000 (Wait for Answer)
    9000 (Wait for Disconnect)
    9 (end of message).

It is a conventional practice to illuminate a lamp on a telephone set 16 whose associated voice mailbox has a message deposited therein. The call completion equipment 10 of the invention is adapted to transmit signals to the telephone switching system 14 when such telephone switching system supports such a capability to cause appropriate telephone set lamps 17 to be illuminated after the deposit of voice messages with the voice store and forward facility 19. In this situation, a control sequence processed by the processor 72 causes a disconnect between the call completion equipment 10 and the telephone switching system 14, and then a subsequent reconnect to place a second internal call to illuminate the telephone set lamp 17. Of course, the telephone switching system 14 would be of the type which responds to special dialing codes to illuminate selected telephone set lamps 17.

As an example, assume an incoming trunk 20 originates in a first personality table and a first translation table. A call sequence 15 call flow control "add digits" field would appear as follows:

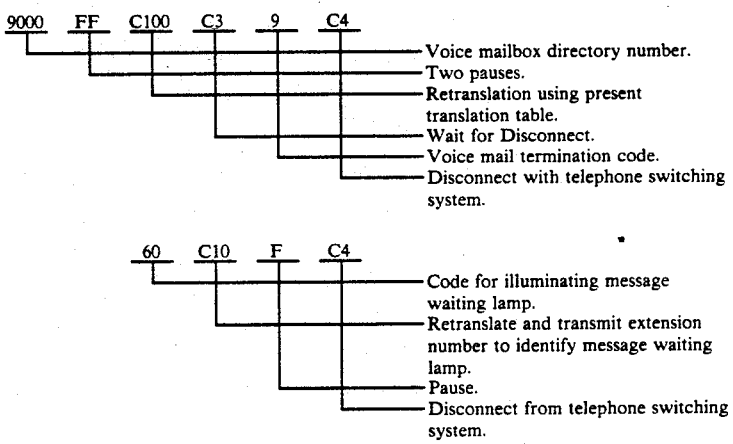

In this example, the directory number of the voice store and forward system is "9000". After two pauses, the digits dialed by the calling party are outpulsed via a retranslation on the translation table utilized when calling the extension (C100). After waiting for a disconnect, code (C3), a termination code "9" is outpulsed. The call completion equipment 10 next idles the telephone switching system 14 by a disconnect code (C4), and waits for a specified guard time according to standard telephone system practices. The call completion equipment 10 then reseizes the telephone switching system 14 and waits until outpulsing can begin. The access code for turning on a message waiting lamp in the example is 60. The dialed digits are again outpulsed via a retranslation on the same translation table utilized when calling the extension (C100). A pause (F) allows time for the telephone switching system 14 to answer and deliver a confirmation tone. Finally, the telephone switching system 14 is again idled by the execution of the code (C4).

According to another feature of the invention, the call completion equipment 10 can provide a default to the voice store and forward facility 19. Such a default can be utilized when the telephone set 16 of the called party is busy, whereupon the call completion equipment 10 automatically invokes the voice store and forward option to assist the calling party in completing a call. When a single voice store and forward facility is utilized, and when each voice mailbox number corresponds to the telephone extension number, and when the message waiting lamp is not utilized, one personality and translation table is sufficient to carry out the default function Assume that the main default index of the personality is "1", then the digit "0" will be outpulsed and route the calling party to the switchboard attendant 18 when no digits are dialed according to the primary message prompt If no digits are dialed during the busy or no-answer message, the busy and no-answer default table indices will both be set to "2". The default table entry "2" would appear as follows: 2000 C2 C100 C 39.

In this example, the directory number of the voice store and forward facility is 2000. After waiting for an answer, the dialed digits are outpulsed via a retranslation on the same translation table utilized when the call was made to the respective extension telephone. As a result, the calling party dialing no digits will be connected to the called party's voice mailbox. After waiting for a disconnect, a termination code is outpulsed to the voice store and forward system 19.

The Appendix illustrates the various entries in the personality tables, the translation tables and the call flow control tables according to the preferred embodiment of the invention. In particular, Table 4 illustrates personality table entries, Table 5 illustrates translation table entries and Table 6 indicates call flow control table entries. The incoming trunks 20 to the call completion equipment 10 originate in a single customer group which start with a first personality. Personality "1" will handle the telephone extension denied voice mailbox options, while personality "2" handles the telephone extensions allowed voice mailbox options. Some of these parameters appear in the appendix in connection with Table 4. The usage and contents of exemplary translation tables are illustrated below in Table 5. Call flow control entries of a number of call flow control tables are illustrated in Table 6. Two default entry tables are shown in connection with Table 7.

From the foregoing, disclosed is call completion equipment for facilitating the cooperation between calling parties and voice store and forward equipment. The call completion equipment operates in conjunction with the telephone switching system to provide voice prompts to calling parties to assist in expediting calls to telephone sets serviced by the switching system, as well as operates to connect calling parties to voice store and forward facilities in the event that called parties are unavailable. The call completion equipment provides a voice prompt to calling parties to input telephone extension numbers to complete calls to the called parties. In the event of a busy or no-answer condition of the called party, or if message leaving or retrieving is initially selected by the calling party, the telephone extension number is outpulsed, together with other digit information, to the voice store and forward facility for automatic connection with the voice mailbox of the called party. The connection of the voice store and forward facility to the calling party by the call completion equipment is transparent to the calling party and to the telephone switching system, thereby facilitating the utilization of the voice store and forward functions with the calling parties. The call completion equipment is provided with a number of personality tables, translation tables and call flow control tables to provide communications and inband signalling transmissions to the voice store and forward facility for providing an automatic connection thereto. The voice messaging facility is also automatically placed in a state for receiving and storing a voice message, or for the retrieval of a previously deposited message. By the use of the various tables, the call completion equipment can outpulse information to place the voice messaging facility in a state for retrieving or depositing a voice message from the calling party, or translate telephone extension digit information into other information representative of a voice mailbox number associated with the called party. Also, by the programmed utilization of the various tables, an enhanced flexibility of the call completion equipment is provided such that a large variety of situations can be accommodated for connecting calling parties with the voice store and forward facility. In addition, enhanced performance is provided in the call completion equipment for transmitting disconnect information to the voice store and forward facility for reducing the overall port active time of such facility.

While the preferred embodiment of the invention has been disclosed with reference to a specific call completion apparatus, it is to be understood that many changes in detail may be made as a matter of engineering choices without departing from the spirit and scope of the invention as defined by the appended claims.

APPENDIX

TABLE I

| Personality Table | |
|---|---|
| Translation Table | There are preferably 8 to 32 different tables by which dialed numbers can be interpreted. |
| Number of Recalls | If the inside party hangs up first the outside party may make a recall. |
| Recall Personality | The Personality to use on a recall. |
| Mode | Answer immediately, delay answer, transfer mode, direct mode. |
| Answer Delay | Define how much time the Call Completion Equipment (CCE) allows the live operator to answer before the CCE answers. |
| Message Numbers for the Main Message | Indentifies the message to be played on new, incoming calls. |
| Dialing Timeout | Dialing time allowed after main message completion before the call defaults. |
| Default Telephone Numbers (Main, Busy, No-answer) | Operator or station to which calls needing assistance will be sent. |
| Busy, No-answer Messages | Defines the messages to play in these cases. |
| Camp-on (hold) Retries Allowed | Defines the number of times a busy extension will be retried before giving the call a message. |
| Type of Music on Hold | (Music provided for: all calls, camp-on calls only, etc.) |

TABLE II

| Translation Table |
|---|
| SECTION 1 |
| DIGITS |
| Digits to be matched, such as extension numbers, codes such as dialing to hold, security codes, codes to invoke another message, etc. |
| SECTION 2 |

TABLE II-continued

Translation Table

| CS | DESCRIPTION |
|---|---|
| 1 | Send dialed digits with or without modifying. |
| 2 | Send dialed digits with or without modifying, only if valid security code has been received. |
| 3 | Send caller to active main default location. |
| 4 | This is a valid security code. |
| 5 | Send caller to busy tone, then, disconnect. |
| 6 | Route caller to another message. |
| 7 | Cut caller through to PBX. |
| 8 | Overlap outpulsing. |
| 9 | This is a camp-on code. |
| 10 | Send caller to active do not answer default location. |
| 11 | Send caller to active busy default location. |
| 12 | This is a ringback learn code. |
| 13 | This is a busy learn code. |
| 14 | Change to alternate Personality, discard digits, and play new main message. |
| 15 | Change to alternate Personality and retranslate received digits. |
| 16 | Redirect previously matched digits. |
| 17 | Change to alternate Personality, retain digits, and play new main message. |
| 18 | Print SMDR record, change to alternate Personality, and play new main message. |
| 19 | Save digits as security code, change to alternate Personality, and play new main message. |
| 21 | Activate new Personality for Customer Group 1. |
| 22 | Activate new Personality for Customer Group 2. |
| 23 | Activate new Personality for Customer Group 3. |
| 24 | Activate new Personality for Customer Group 4. |
| 40 | Start DTMF receiver test. |

SECTION 3
INDEXES

Indexes to call flow control table, can be 0-32 indexing the entries thereof.

TABLE III

Call Flow Control Table

| INDEX(1-32) | CODES AND/ OR DIGITS | FUNCTION |
|---|---|---|
| 1 | C0 | Change mode from tone to rotary dial. |
| 2 | C1XX | Retranslate dialed digits, send to PBX. |
| 3 | C2 | Wait for PBX Answer. |
| 4 | C3 | Wait for C0 or PBX answer. |
| 5 | C4 | Disconnect from PBX. |
| 6 | C5 | Insert Trunk Number. |
| 7 | C6 | Hook flash. |
| 8 | 200C0300 | Send 200 in DTMF, Send 300 in rotary pulse. |
| . | | |
| . | | |
| . | | |
| 32 | | |

TABLE IV

Personality Table

| | | Personality 1 | Personality 2 |
|---|---|---|---|
| TTN | Translation Table | 1 | 2 |
| MIMN | Main Message Number | 1 | 1 |
| MDN | Main Default Index | 1 | 1 |
| DNMN | No-answer Message | 16 | 28 |
| DNDN | No-answer Default | 1 | 2 |
| BMN | Busy Message Number | 17 | 29 |
| BDN | Busy Default Index | 0 | 0 |

TABLE V

Translation Table

| TABLE NUMBER & USAGE | DIGITS | CALL SEQ | Call Flow Control Table Index |
|---|---|---|---|
| 1- Extensions which do not hae mailboxes | 0 | 3 | 0 |
| | 8 | 9 | 0 |
| | 9 | 1 | 0 |
| | 31FF | 15 | 2 |
| | 3FFF | 1 | 0 |
| | 42FF | 15 | 2 |
| | 4FFF | 1 | 1 |
| | FFFF | 3 | 0 |
| 2- Extensions which do have voice mailboxes | 0 | 15 | 1 |
| | 5 | 16 | 0 |
| | 8 | 9 | 0 |
| | 9 | 15 | 1 |
| | 31FF | 1 | 0 |
| | 42FF | 1 | 1 |
| | FFFF | 15 | 1 |
| 3- Voice mail machine directory numbers | 31FF | 1 | 1 |
| | 42FF | 1 | 2 |
| 4- Mailbox numbers | 31FF | 1 | 1 |
| | 42FF | 1 | 2 |
| 5- Waiting lamp numbers | FFFF | 1 | 1 |

TABLE VI

Call Flow Control Table

| TABLE NUMBER & USAGE | ENTRY NUMBERS | # TO DELETE | ADDED DIGITS |
|---|---|---|---|
| 1- Extensions which do not have mailboxes | 1 | 0 | 88F |
| 2- Extensions which do have voice mailboxes | 1 | 0 | 88F |
| | 2 | 0 | C103C2 |
| | | | #C104C3 |
| | | | *C428C105C4 |
| 3- Voice mail machine directory numbers | 1 | 4 | 133 |
| | 2 | 4 | 88F134 |
| 4- Mailbox numbers | 1 | 2 | 50 |
| | 2 | 2 | 51 |
| 5- Waiting lamp numbers | 1 | 1 | None |

TABLE VII

Default Table

| ENTRY NUMBER | CONTENTS |
|---|---|
| 1 | 0 |
| 2 | C103C2#C104C3*C428C105C4 |

What is claimed is:

1. A method of facilitating the integration of a voice store and forward function with telephone switching apparatus, comprising the steps of:

using a call completion system remote from a calling party to prompt the calling party to enter first destination-determining information relating to a called party;

receiving said first destination-determining information;

determining that a called party to whom the calling party wishes to communicate is unavailable;

transmitting a signal to the calling party indicating the unavailability of the called party;

collecting second destination-determining information from the calling party for connecting the calling party to a voice store and forward facility;

initially isolating the calling party from the voice store and forward facility so that the calling party cannot hear audible prompts which may be generated by the voice store and forward facility;

translating said first and second destination-determining information into a first code identifying a voice store and forward facility, and a second code identifying a voice mailbox associated with the called party;

causing the switching apparatus to access said voice store and forward facility and for causing said switching apparatus to establish a communication path to the facility;

transmitting said first and second code to said facility via said communication path;

connecting said calling party to said communication path so that said calling party can deposit a voice message with said voice store and forward facility; and processing incoming calls by the calling party by arranging destination-determining information in a sequence code with other digit information including pauses for allowing intercommunication to the voice store and forward facility.

2. The method of claim 1 and further comprising arranging information in said sequence code to connect and disconnect said switching apparatus.

3. A method of facilitating the integration of a voice store and forward function with telephone switching apparatus, comprising the steps of:

responding to a request for service directed to the telephone switching apparatus;

prompting a calling party originating the request for service as to the manner for completing the call to the switching apparatus;

in response to said step of prompting, collecting first destination-determining information from the calling party, storing said first destination-determining information and transmitting the first destination-determining information to the telephone switching apparatus to complete a call to a called party associated with the first destination-determining information and said switching apparatus;

detecting an unavailability condition of the called party;

prompting the calling party to select one of a plurality of options including an option of invoking the service of the voice store and forward facility;

receiving second information from the calling party concerning a request to be connected to the voice store and forward facility;

using the first destination-determining information and the second information in generating a signal different from the first destination-determining information;

signalling the voice store and forward facility with said signal that a voice message is to be deposited therewith;

signalling the voice store and forward facility of the identity of a voice mailbox with which said voice message is to be deposited;

causing a connection to be made between said voice store and forward facility and the calling party;

generating said signal in call completion apparatus connected to the switching apparatus; and storing in said call completion apparatus information concerning whether each of a plurality of telephone sets associated with the switching apparatus are also associated with the voice store and forward facility.

4. Call completion equipment for interfacing a voice store and forward facility with a telephone switching system in conjunction with a central office, comprising:

a switching network coupled to an incoming trunk signal from the central office and an outgoing trunk signal to the telephone switching system;

a hybrid interface coupled to said switching network operable to receive and transmit information on said trunk signals;

a ring detector coupled to said incoming trunk signal operable to detect a communication request from the central office;

a DTMF detector coupled to said hybrid interface operable to detect dialing information from said housing trunk signal;

a call progress tone detector coupled to said hybrid interface operable to detect the progress of said incoming trunk signal;

a hold and message system coupled to said hybrid interface operable to provide wait states and prompts over said incoming trunk signal;

an outpulse coupled to said outgoing trunk signal operable to establish a communication path to the telephone switching system for connecting the central office to the voice store and forward facility; and a processor system operable to control the operation of call completion equipment components.

* * * * *

UNITED STATES PATENT AND TRADEMARK OFFICE
CERTIFICATE OF CORRECTION

PATENT NO. : 5,249,219
DATED : Sep. 28, 1993
INVENTOR(S) : Morganstein et al.

It is certified that error appears in the above-identified patent and that said Letters Patent is hereby corrected as shown below:

Column 1, Line 28, after "between individuals", insert -- , -- .

Column 3, Line 5, after "the drawings", insert -- where -- .

Column 10, Line 15, after "number of considerations", insert -- . -- .

Column 10, Line 17, after "voice messaging facility", insert -- . -- .

Column 24, Line 2, after "parties dialing digits", delete "," .

Column 24, Line 3, after "default number", insert -- . -- .

Column 27, Line 5, after "function", insert -- . -- .

UNITED STATES PATENT AND TRADEMARK OFFICE
CERTIFICATE OF CORRECTION

PATENT NO. : 5,249,219

DATED : Sep. 28, 1993

INVENTOR(S) : Morganstein et al.

It is certified that error appears in the above-identified patent and that said Letters Patent is hereby corrected as shown below:

Column 27, Line 9, after "primary message prompt", insert -- . -- .

Column 30, Line 6, after "not", delete "hae", and insert -- have -- .

Column 31, Line 19, after "and further", delete "comprising" and insert --including-- .

Col. 31, Line 23, after "store and forward", delete "function" and insert -- facility-- .

Col. 32, Line 33, delete "housing" and insert --incoming-- .

Signed and Sealed this

Twenty-third Day of August, 1994

BRUCE LEHMAN

*Attest:*

*Attesting Officer*           *Commissioner of Patents and Trademarks*